V. M. HARRIS.
MOTOR STARTER.
APPLICATION FILED AUG. 24, 1912. RENEWED NOV. 2, 1914.

1,120,616.

Patented Dec. 8, 1914.

3 SHEETS—SHEET 1.

V. M. HARRIS.
MOTOR STARTER.
APPLICATION FILED AUG. 24, 1912. RENEWED NOV. 2, 1914.
1,120,616.
Patented Dec. 8, 1914.
3 SHEETS—SHEET 2.
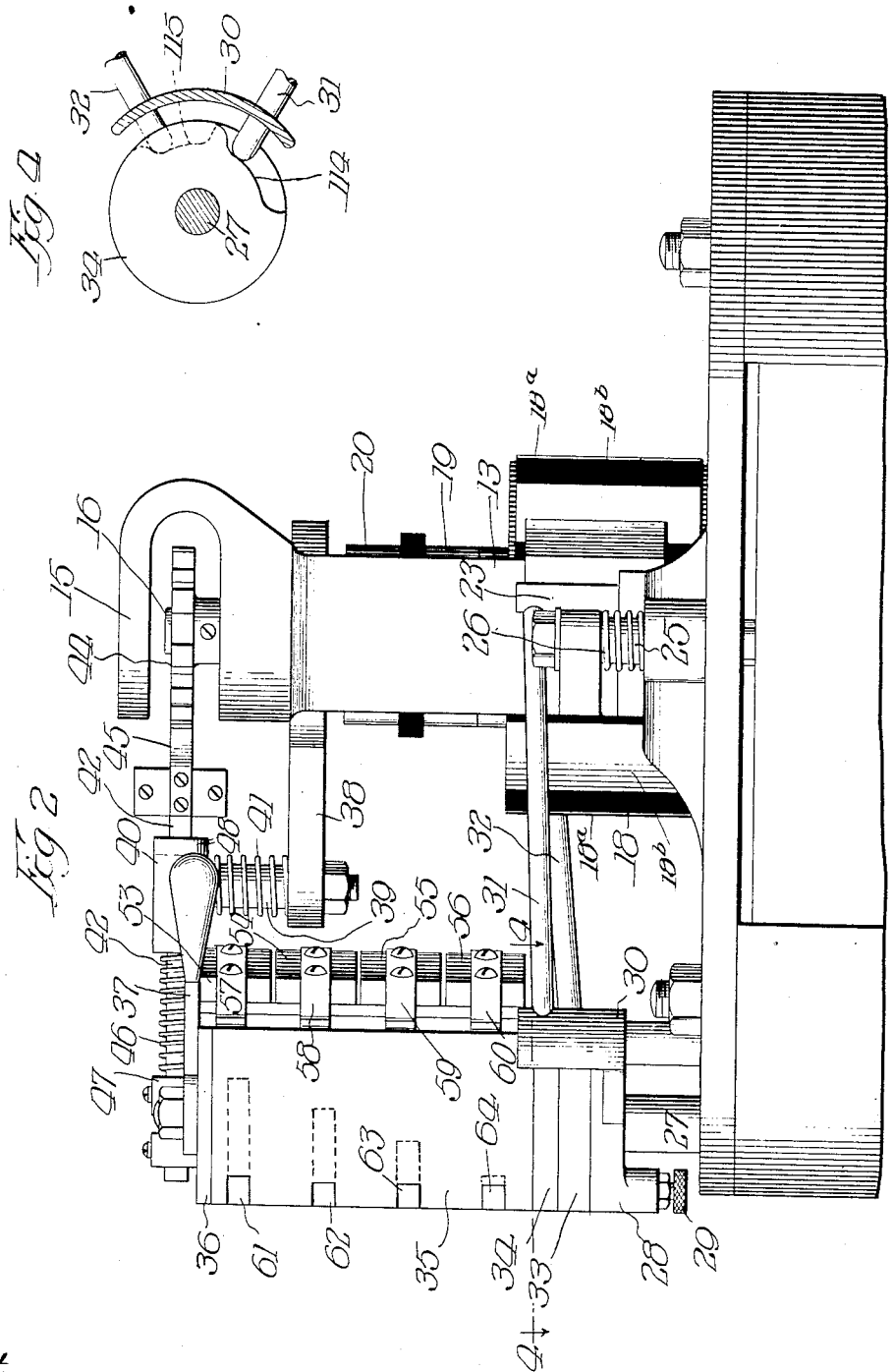

UNITED STATES PATENT OFFICE.

VARIAN M. HARRIS, OF CHICAGO, ILLINOIS, ASSIGNOR TO HENRY S. HAWLEY, TRUSTEE, OF CHICAGO, ILLINOIS.

MOTOR-STARTER.

1,120,616.  Specification of Letters Patent.  Patented Dec. 8, 1914.

Application filed August 24, 1912, Serial No. 716,809. Renewed November 2, 1914. Serial No. 869,973.

*To all whom it may concern:*

Be it known that I, VARIAN M. HARRIS, a citizen of the United States, residing at Chicago, in the county of Cook and State of Illinois, have invented certain new and useful Improvements in Motor-Starters, of which the following is a specification.

My invention relates to motor starters, and refers particularly, though not exclusively, to starters used for synchronous motors.

In my co-pending application, Serial No. 629,466, filed May 25, 1911, I have described a type of synchronous motor which is particularly adapted for use with a rectifying commutator for the purpose of converting alternating current into unidirectional pulsating current.

My present invention, relating to motor starters, is particularly adapted for use in connection with the motor which has been described in the above-mentioned application, and which I shall again describe in general terms in the present application in order that the operation of the starter may be clearly understood.

According to the provisions of my invention, the rotor of my motor is suitably started, by mechanical means or otherwise, and the fields are intermittently energized in such manner that the speed of the rotor increases until synchronism is reached. When this condition results, a suitably controlled governor effects certain changes in the electric circuit controlling the field so that normal operation of the motor is effected, and it is retained in synchronism with the source of alternating current. After synchronism has been attained, I provide means by which the circuit which is temporarily closed through the field by means of the governor is permanently closed, and the motor then continues to run at synchronous speed entirely independently of the action of the governor.

As further objects of my invention I provide apparatus in connection with my starter by which suitable electric connections are made to enable my motor to be used with a rectifying commutator. Means are also provided for indicating when the rotor has attained synchronous speed, and further means to indicate the polarity of the unidirectional current which flows from the rectifying commutator.

These and other advantages of my invention will be more readily understood by reference to the accompanying drawings, which represent a preferred embodiment of my invention, and in which—

Figure 1:
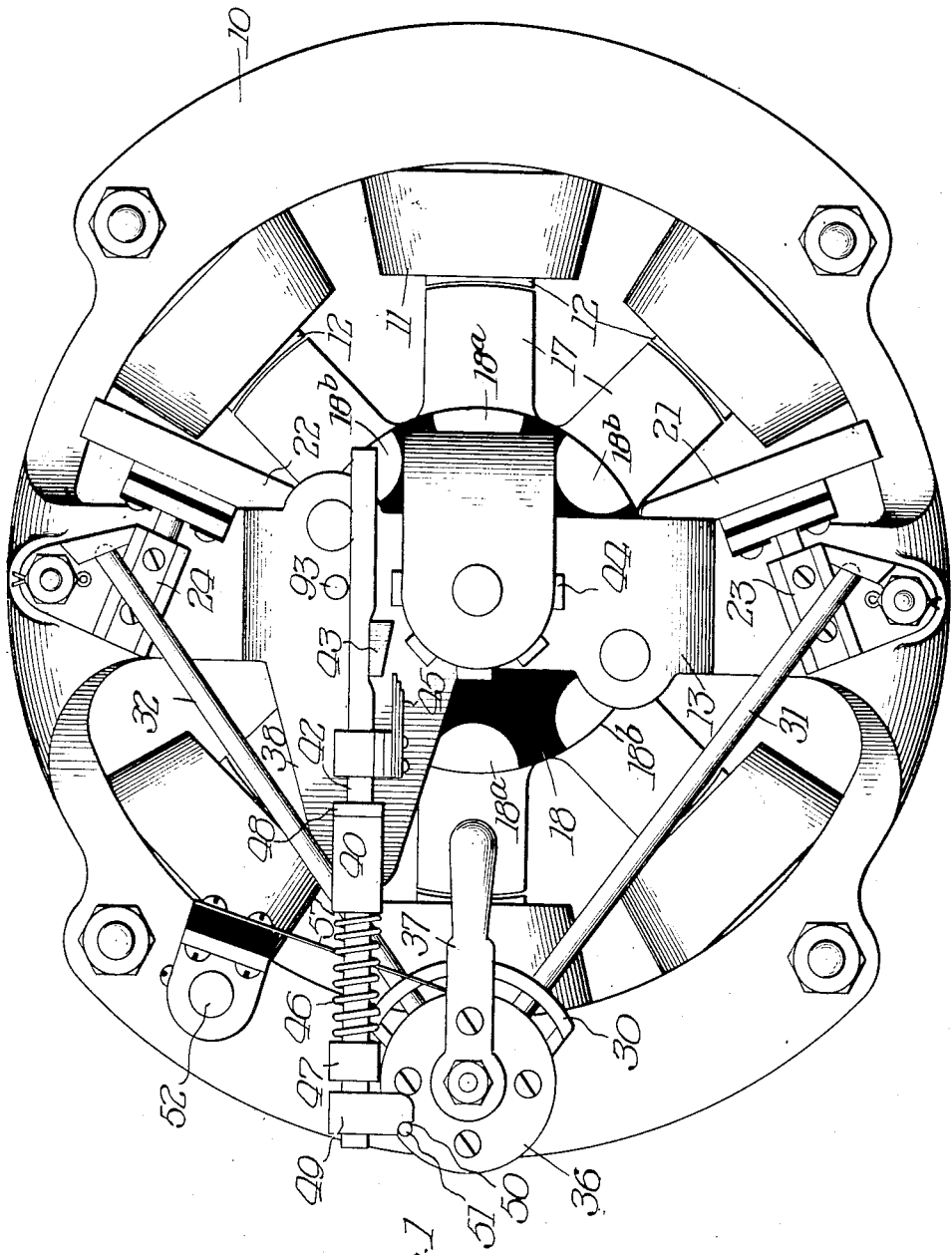
Figure 5:
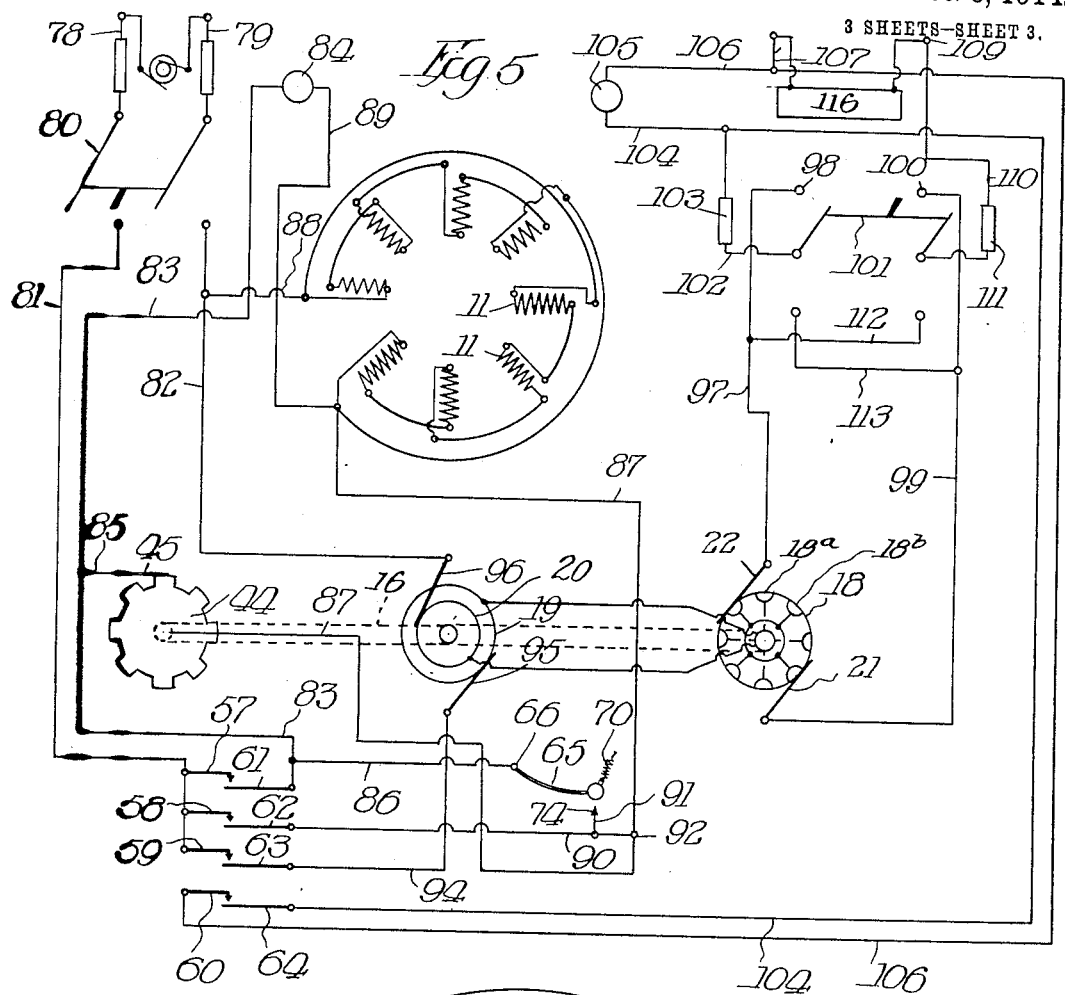
Figure 3:
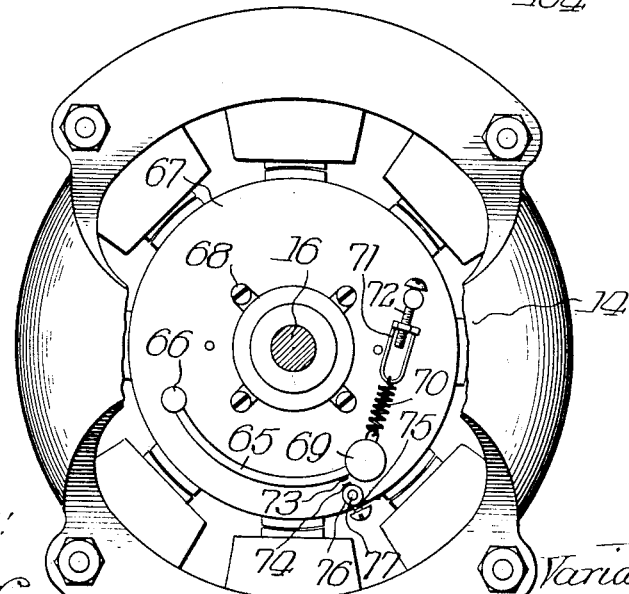

Figure 1 is a plan of my improved motor, showing the starter applied thereto; Fig. 2 is a side elevation of the upper part of my motor, showing the starter in position; Fig. 3 is a bottom plan of my motor, the lower part of the field casing being broken away in order to show the automatic governor; Fig. 4 is a horizontal section on the line 4—4 of Fig. 2, but with the cams rotated to a different position from that in which they are shown in Fig. 2; and Fig. 5 is a diagram showing the wiring used in connection with my starter and the motor and rectifying commutator with which the starter is adapted to operate.

The motor with which my invention is particularly adapted to be used consists of a field casing 10 having the poles 11, each of which is provided with a pole piece 12. The field casing 10 is provided with an upper spider 13 and a lower spider 14. The upper spider 13 has connected therewith the bearing member 15.

Mounted on the rotor shaft 16 are a series of laminated plates which are suitably shaped to form the rotor pole pieces 17, these pole pieces being preferably of the same number as the pole pieces 12 of the field. Also mounted on the rotor shaft 16 is a rectifying commutator 18, comprising a plurality of conducting segments $18^a$, and alternating with these the conducting segments $18^b$. The segments $18^a$ are electrically connected with the slip ring 19 and the segments $18^b$ with the slip ring 20 by means of conductors passing through the body of the commutator 18.

Engaging the commutator 18 are the commutator brushes 21 and 22, these brushes being held by the brush holders 23 and 24, respectively. Each of the brush holders is pivotally mounted on a pin 25, and is normally moved by the spring 26 into a position in which the brush is held in engagement with the commutator 18.

Mounted on the field casing 10 is the pillar 27, on which is rigidly mounted the frame 28, through which passes the spring-controlled stop 29, the object of which will be explained hereafter. Attached to the frame 28 is a guide frame 30 having apertures therein through which pass a rod 31 leading to the brush holder 23 and a second rod 32 leading to the brush holder 24. Rotatably mounted on the pillar 27 and having its bearing against the frame 28 is a cam 33, and rigidly connected with this cam is a second cam 34. Also rotatably mounted on the pillar 27 and rigidly connected with the cams 33 and 34 so as to be rotatable therewith is the drum 35, of insulating material. Attached to the upper end of the drum 35 is the face plate 36, to which is rigidly attached the operating handle 37.

Extending from the upper spider 13 is the arm 38, having mounted thereon the post 39 which has rotatably mounted on its end the sleeve 40, the rotation of which is controlled by the spring 41. The object of this spring will be explained hereafter. Passing through the sleeve 40 is a rod 42, carrying thereon the dog 43, which is adapted to engage the teeth of the starting wheel 44 rigidly mounted on the rotor shaft 16. Also carried by the rod 42 is a brush 45, which engages the teeth of the starting wheel 44 when the rod 42 is moved to the proper position, as will presently be explained. The rod 42 is normally moved into the position shown in Fig. 1 by the action of the spring 46, which engages on one end the sleeve 40 and on the other end the block 47 carried on the rod 42, so that the collar 48 on the rod 42 is brought into engagement with the end of the sleeve 40. Near the end of the rod 42 is mounted the member 49, which extends over the face plate 36 and has therein a notch 50 which is engaged by the pin 51 mounted on the face plate 36.

The post 52 which is mounted on the field casing 10 carries the contact holders 53, 54, 55 and 56, which carry, respectively, the spring contacts 57, 58, 59 and 60. These spring contacts engage the periphery of the drum 35. Mounted on the drum 35 are the conducting segments 61, 62, 63 and 64, which are included in the electric circuits which will presently be described. As shown in Fig. 2, the segments 61, 62, 63 and 64 are of different lengths so that they are successively brought into contact with the contacts 57, 58, 59 and 60 as the drum 35 is rotated in a clockwise direction by means of the handle 37.

The governor which is used in connection with my invention is illustrated in Fig. 3. It may be placed in any convenient position on the rotor shaft 16, but in my motor I prefer to place it below the laminated plates which form the rotor. The governor 65 is pivotally attached to the post 66 mounted on the disk 67, which is of insulating material, and may be fastened to the rotor by any suitable means, as, for example, by the screws 68. At its end the governor 65 is provided with the ball or weight 69, to which is attached the spring 70 anchored at its opposite end to the disk 67 through the instrumentality of the adjustable yoke 71 and screw 72. On the governor 65 is the contact 73 adapted to engage the contact 74 on the end of the screw 75 which is held in adjusted position in the post 76 by means of the set screw 77.

Through the instrumentality of slip rings and brushes, or by any other suitable well known means, which, for the sake of simplicity, have not been shown in the drawings, an electrical connection is made on the one hand with the post 66 to which the governor 65 is pivotally attached, and on the other hand to the post 76. The circuits employed with these connections will be explained in detail hereafter.

The operation of my starter will now be explained particularly in connection with the diagram shown in Fig. 5. Alternating current from any suitable source passes through the main conductors 78 and 79. The switch 80 is adapted to connect the conductor 78 with the conductor 81 and the conductor 79 with the conductor 82. When it is desired to start the motor, the handle 37 is rotated in a clockwise direction, whereby the pin 51 on the face plate 36 carries the rod 42 forward and at the same time inwardly toward the starting wheel 44, so that the dog 43 engages one of the teeth of this wheel and rotation of the rotor shaft 16 begins. The cam 33 is, of course, moved with the drum 35, and is provided with a series of recesses in its lower surface, which are engaged by the spring-controlled stop 29 so that the various positions of the starting device are easily determined and after being determined may be readily maintained. When the handle 37 is moved into the position which has just been described, and which I will term "position No. 1", the brush 45 is moved with the rod 42 so that it engages successive teeth of the starting wheel 44 as the latter is rotated. The spring contact 57, which is suitably connected with the conductor 81, is brought into engagement with the segment 61 on the drum 35. This segment 61 is connected with conductor 83, which leads to the lamp 84. The conductor 85 connects the conductor 83 with the brush 45, while the conductor 85 connects the conductor 83 with the brush 45, while the conductor 86 leads from conductor 83 to the post 66 to which the governor 65 is attached. When the brush 45 is in contact with one of the teeth of the starting wheel 44 during rotation of the latter, the current passes from the main conductor 78 through the switch 80 to the conductor 81, and thence through the spring contact 57, the segment 61, the conductors 83 and 85, and the brush 45, to the wheel 44, and thence through the conductor 87 to the windings of the poles 11 of the motor field. After passing through these windings, the current passes through conductor 88 to the conductor 82, and thence through the switch 80 to the main conductor 79, thereby completing the circuit. When the wheel 44 is in such position that the brush 45 is between the teeth of the wheel, and electrical connection with the latter is thereby broken, the current after reaching the conductor 83 passes to the lamp 84, and thence through the conductor 89 to the windings of the poles 11 of the field of the motor, and thence through the conductor 88 to the conductor 82, from which the current then passes through the switch 80 to the main conductor 79.

It will be evident that when the circuit is as just described, the lamp 84 will be lighted, but on account of the resistance offered by said lamp the energization of the coils of the poles 11 will be comparatively slight. The wheel 44 is so disposed on the rotor shaft 16 that the brush 45 will be in engagement with the teeth of the wheel 44 while the pole pieces 17 of the rotor approach the pole pieces 12 of the field poles 11 after the pole pieces 17 have passed the positions midway between the pole pieces 12. When the pole pieces 17 are brought into positions opposite the pole pieces 12, however, the electrical connection between the brush 45 and the starting wheel 44 is broken, and is not again made until the pole pieces 17 have again passed midway position between the pole pieces 12. It will be evident that in this way the motor acts as an attraction motor, and the speed of the rotor is constantly increased until the contact 73 of the governor 65 is brought into engagement with the contact 74 in electrical connection with the post 76, which, in turn, is connected with conductor 90 by the conductor 91. The conductor 90 is connected at 92 with the conductor 87, so that when the circuit is closed through the governor the current flows from conductor 83, through conductor 86, governor 65, conductors 91, 90 and 87, to the coils of the field poles 11, and thence through the conductors 88 and 82 through the switch 80 to the main conductor 79, thereby completing the circuit. The tension of the spring 70 and the position of the contact 74 are so adjusted that the contact 73 engages the contact 74 when the speed of rotation of the rotor is synchronous with the alternations of the main current, or slightly in excess thereof. After the circuit is closed through the governor no current will flow through the lamp 84, so that the latter will become extinguished. The lamp 84, therefore, acts as a means for indicating when the rotor has been brought into synchronism with the main current.

After synchronism has been attained and the lamp 84 indicating this condition is extinguished, the handle 37 is moved in a clockwise direction into position No. 2. The pin 51 thereby becomes disengaged from the member 49, so that the spring 46 causes the rod 42 to be moved to bring the collar 48 into engagement with the sleeve 40, thereby disengaging the brush 45 from the teeth of the starting wheel 44. The spring 41 serves to move the inner end of the rod 42 away from the starting wheel until the rod engages the pin 93. The spring contact 58 has meanwhile been brought into contact with the segment 62, which is in electrical connection with the conductor 90. The spring contact 58 being connected with conductor 81, the current now passes from conductor 81 through contact 58, segment 62, and conductor 90 to conductor 87, and thence through the same path as previously described, back to the main conductor 79. The circuit which is now established is the permanent equivalent of the circuit which is temporarily closed by means of the governor 65. It often happens that before the rotor is brought into exact synchronism with the main source of current, the governor 65 opens and closes several times the circuit which it controls. The handle 37 is next moved in a clockwise direction to position No. 3, whereby the spring contact 59 is brought into engagement with the segment 63. Inasmuch as the contact 58 still remains in engagement with the segment 62, it will be evident that the circuit controlling the coils of the field will remain closed. The effect of bringing the contact 59 into engagement with the segment 63 is to establish an entirely new circuit, whereby that portion of the main alternating current which is to be rectified is brought to the rectifying commutator. The current flows from the conductor 81 through spring contact 59, segment 63, and conductor 94 to the brush 95, which engages one of the slip rings, for example, the slip ring 19. From this slip ring the current passes to one series of alternate segments 18ª of the commutator 18. The brush 96 is connected with conductor 82, and engages the slip ring 20, which, as previously explained, is connected with the second series of alternate segments 18ᵇ of the commutator 18. The alternating current passing to the slip rings is converted into unidirectional current at the commutator 18, current of one polarity passing through the brush 22 and conductor 97, and current of the opposite polarity passing through brush 21 and conductor 99.

Assuming that the double-throw switch 101 is placed in position so that its switch blades engage the switch contacts 98 and 100, the current from conductor 97, for example, will pass through the switch to the conductor 102 and through fuse 103, placed in said conductor, to conductor 104, thence through lamp 105 and conductors 106 and 107, to the terminal 108, to which is attached, by a suitable conductor, one pole of a storage battery 116 or the like. The current after passing through the storage battery returns through a suitable conductor to the contact 109, and thence passes through conductor 110 containing the fuse 111, to the switch 101 and through said switch to the conductor 99, thereby completing the circuit. It is well known that in charging a storage battery the current flowing to the battery must be in opposition to the current which the battery tends to generate. If the charging is not performed in this manner, the battery would be rapidly discharged instead of being charged.

Assume that the electromotive force of the battery is 70 volts, and that the electromotive force of the current flowing from the commutator 18 is 110 volts at the peaks of the phase waves. It will now be evident that if the brushes 22 and 21 are connected with a storage battery through the various conductors which have been mentioned so that the charging current is not counter to the current tending to flow from the battery, the effective electromotive force acting on lamp 105 would be 180 volts. If the lamp 105 is of the ordinary 220-volt type, it will therefore be evident that this lamp would burn brightly, whereas if the electromotive force of the unidirectional current from the commutator 18 is in opposition to the current of the storage battery, the effective electromotive force would be only 40 volts, so that the lamp 105 would burn dimly.

When the starter is in position No. 3, which we have just described, it will be clear that the current flowing between the storage battery and the commutator 18 must pass through the lamp 105, and on account of the resistance of this lamp deterioration of the battery by too rapidly exhausting the same (provided the flow of current from the rectifying commutator 18 is not in opposition to that of the battery) is prevented.

If the lamp 105 burns brightly, the switch 101 is then moved into its alternate position so that current from the conductor 97 passes through conductor 112, through switch 101, and conductor 110 to the terminal 109. After flowing through the battery the current then passes through conductors 107 and 106 to lamp 105, and thence through conductors 104 and 102 to switch 101, from which it passes through conductor 113 to conductor 99. In other words, when the switch 101 is in its first position the current from the commutator 18 flows to the battery in one direction and when the switch 101 is placed in its second position the current flows in the opposite direction, thereby making it readily possible to properly adjust the polarity of the current flowing from the rectifier to the battery.

When the starting device is in positions Nos. 1 and 2 the cams 33 and 34 are in such position that the rods 31 and 32 are held by the peripheries of these cams so that the brushes 21 and 22 are held out of contact with the commutator 18; but when position No. 3 of the starting devices is reached, the rods 31 and 32 are allowed to move into the recesses 114 and 115 of the cams 34 and 33, whereby the brushes 21 and 22 are allowed to come in contact with the commutator 18. These positions of the cams are indicated in Fig. 4.

After the switch 101 has been adjusted in such position that the lamp 105 burns dimly, the handle 37 is moved to position No. 4. The ends of the rods 31 and 32 still remain in the recesses 114 and 115, thereby still maintaining the commutator brushes 21 and 22 in contact with the commutator 18. The spring contacts 57, 58 and 59 also still remain in engagement with their respective segments 61, 62 and 63, and the spring contact 60 is now brought into engagement with the segment 64. Assuming that the switch 101 is in contact with the switch terminals 98 and 100, it will be evident that current from the conductor 97 after reaching the conductor 104 will pass along said conductor to the segment 64, and thence through the spring contact 60 and conductor 106 to the conductor 107 instead of passing through the lamp 105, as was the case when the starter was in position No. 3. Similarly, if the switch 101 is in its second position, the current from conductor 99 after passing through conductor 113 follows the path just described. When the starter has been moved to position No. 4, all conditions are such that the motor is adapted to run indefinitely. The rotor of the motor is maintained in synchronism with the main source of alternating current by the utilization of a small percentage of said current, while the main portion of the alternating current is converted into unidirectional pulsating current and used for the charging of a storage battery or other similar purpose.

It will be clear to those skilled in the art that many changes could be made in the detailed construction of the various parts which I have described without departing from the spirit or scope of my invention.

What I claim is:

1. A starter for synchronous motors, comprising the combination with a source of alternating current of means for intermittently connecting said source with the field winding of said motor during predetermined portions of the revolution of the rotor, whereby the speed of said rotor is increased, and governing means for automatically connecting said source with said field winding during the entire revolution of said rotor when the speed of the latter approximates that of synchronism, thereby bringing the rotor into synchronism with said source substantially as described.

2. A starter for synchronous motors, comprising the combination with a source of alternating current of means for starting the rotation of the rotor, means for intermittently connecting said source with the field winding of said motor during predetermined portions of the revolution of the rotor, whereby the speed of said rotor is increased, and governing means for automatically connecting said source with said field winding during the entire revolution of said rotor when the speed of the latter approximates that of synchronism, thereby bringing the rotor into sychronism with said source, substantially as described.

3. A starter for synchronous motors, comprising the combination with a source of alternating current of means for intermittently connecting said source of alternating current with the field winding of said motor during predetermined portions of the revolution of the rotor, whereby the speed of said rotor is increased, governing means for automatically connecting said source with said field winding during the entire revolution of said rotor when the speed of the latter approximates that of synchronism, thereby bringing the rotor into synchronism with said source, and means for permanently connecting said source with said field winding, whereby the rotor is maintained in synchronism with said source, substantially as described.

4. A starter for synchronous motors, comprising the combination with a source of alternating current of means for starting the rotation of the rotor, means for intermittently connecting said source with the field winding of said motor during predetermined portions of the revolution of said rotor, whereby the speed of the latter is increased, governing means for automatically connecting said source with said field winding during the entire revolution of said rotor when the speed of the rotor approximates that of synchronism, thereby bringing said rotor into synchronism with said source, means for permanently connecting said source with said field winding, whereby the rotor is maintained in synchronism with said source, and means for breaking the intermittent connection between said source and said field winding when said permanent connection is established, substantially as described.

5. A starter for synchronous motors, comprising the combination with a source of alternating current of a starting wheel having a plurality of teeth and adapted to be mounted on the rotor shaft, actuating means for engaging said wheel, whereby the rotation of said rotor is started, a brush adapted for engagement with the teeth of said starting wheel, means for connecting said brush with said source of alternating current, means for connecting said starting wheel with the field of said motor, whereby said field winding may be connected with said source during engagement of said teeth by said brush, thereby increasing the speed of said rotor, and governing means for automatically connecting said field winding with said source when a predetermined rate of speed is reached, thereby bringing said rotor into synchronism with said source, substantially as described.

6. A starter for a synchronous motor having a rectifying commutator, comprising the combination with a source of alternating current of means for starting the rotation of the rotor, means for intermittently connecting said source with the field winding of said motor during predetermined portions of the revolution of the rotor, whereby the speed of the latter is increased, governing means for automatically connecting said source with said field winding during the entire revolution of the rotor when the speed of said rotor approximates that of synchronism, thereby bringing said rotor into synchronism with said source, means for permanently connecting said field winding with said source, whereby said rotor is maintained in synchronism with said source, and means for connecting the current rectifying means of said rectifier with said source, whereby a pulsating unidirectional current may be conducted from said rectifier, substantially as described.

VARIAN M. HARRIS.

Witnesses:
HENRY M. HUXLEY,
L. E. HANNEN.